(12) United States Patent
Anturkar et al.

(10) Patent No.: US 11,641,369 B1
(45) Date of Patent: May 2, 2023

(54) SYSTEMS AND METHODS FOR MANAGING DIGITAL PERSONAS FOR ONLINE SERVICES

(71) Applicant: NortonLifeLock Inc., Tempe, AZ (US)

(72) Inventors: Kapil Anturkar, Torrance, CA (US); SriHarsha Angara, Fremontt (UA)

(73) Assignee: Gen Digital Inc., Tempe, AZ (US)

( * ) Notice: Subject to any disclaimer, the term of this patent is extended or adjusted under 35 U.S.C. 154(b) by 511 days.

(21) Appl. No.: 16/831,596

(22) Filed: Mar. 26, 2020

(51) Int. Cl.
*H04L 9/40* (2022.01)
*G06F 16/958* (2019.01)

(52) U.S. Cl.
CPC ........ *H04L 63/1425* (2013.01); *G06F 16/958* (2019.01); *H04L 63/0421* (2013.01)

(58) Field of Classification Search
CPC ............. H04L 63/1425; H04L 63/0421; G06F 16/958
See application file for complete search history.

(56) References Cited

U.S. PATENT DOCUMENTS

| | | | | |
|---|---|---|---|---|
| 2007/0180039 A1* | 8/2007 | Sutidze | .................. | G06Q 10/00 709/206 |
| 2013/0125239 A1* | 5/2013 | McHugh | ................. | H04L 63/14 726/25 |
| 2014/0047043 A1* | 2/2014 | Esfahani | .............. | G06Q 10/107 709/206 |
| 2016/0248797 A1* | 8/2016 | Yampolskiy | .......... | G06F 21/577 |
| 2017/0142158 A1* | 5/2017 | Laoutaris | .............. | H04W 12/02 |
| 2017/0195310 A1* | 7/2017 | Tyler | ..................... | H04L 63/083 |
| 2018/0174213 A1* | 6/2018 | Barday | .............. | G06Q 30/0609 |

OTHER PUBLICATIONS

Hu et al., "Characterizing Pixel Tracking through the Lens of Disposable Email Services", May 2019, IEEE Symposium on Security and Privacy, pp. 365-379 (Year: 2019).*

* cited by examiner

*Primary Examiner* — Kenneth W Chang
(74) *Attorney, Agent, or Firm* — Greenberg Traurig, LLP (57) ABSTRACT

The disclosed computer-implemented method for managing digital personas for online services may include generating a digital persona and a persona wear indicator (PWI) score for a user of an anonymized inbox with a communication alias to use for an online entity, determining, based on one or more communication messages associated with the communication alias, that the online entity has leaked information associated with the digital persona, recalculating the PWI score for the digital persona based at least in part on the determination that the online entity has leaked the information, determining that the PWI score exceeds a privacy score threshold; and in response to determining that the PWI score exceeds the privacy score threshold, performing a security action that protects privacy of the user. Various other methods, systems, and computer-readable media are also disclosed.

20 Claims, 7 Drawing Sheets

SYSTEMS AND METHODS FOR MANAGING DIGITAL PERSONAS FOR ONLINE SERVICES

BACKGROUND

Users may use a variety of online service providers (e.g., online vendors, digital streaming providers, news outlets, etc.) and may need to share details, such as an email address, phone number, or payment information (e.g., credit card, banking information, etc.). Unfortunately, once a user creates an account with an online service provider, user has very little control or no control on the extent to which the online service provider shares the user's account information with other entities or any other leakage of personal or financial data. Furthermore, when an online service provider has shared the user's account information, there is no mechanism for users to identify which of the online services he or she subscribes to has shared the account data. Users may continue to use an account that has been compromised without realizing that their information has been shared or leaked by the online service provider. The present disclosure, therefore, identifies and addresses a need for systems and methods for managing digital personas for online services.

SUMMARY

As will be described in greater detail below, the present disclosure describes various systems and methods for managing digital personas for online services.

In one example, a method for managing digital personas for online services may include (i) generating a digital persona and a persona wear indicator (PWI) score for a user of an anonymized inbox with a communication alias to use for an online entity, (ii) determining, based on one or more communication messages associated with the communication alias, that the online entity has leaked information associated with the digital persona, (iii) recalculating the PWI score for the digital persona based at least in part on the determination that the online entity has leaked the information, (iv) determining that the PWI score exceeds a privacy score threshold, and (v) in response to determining that the PWI score exceeds the privacy score threshold, performing a security action that protects privacy of the user.

In some examples, the security action may include notifying the user that the digital persona has been compromised and deleting the digital persona in response to receiving an indication from the user. In some examples, the security action may include notifying the user that the digital persona has been compromised and replacing data of the digital persona with newly generated data. The digital persona may include at least one of the communication alias, a masked credit card number, or a masked identifier.

Determining that the online entity has leaked information associated with the digital persona may include (i) monitoring the anonymized inbox to identify communications that are sent to the communication alias, (ii) tagging the communications that are sent to the communication alias as solicited or unsolicited, and (iii) identifying the communications sent to the communication alias from different entities while monitoring the anonymized inbox. In some examples, the method may include weighting the tagged communications from the anonymized inbox and recalculating the PWI score for the digital persona based on a weighted value for the tagged communications from the anonymized inbox. Recalculating the PWI score for the digital persona may include (i) receiving additional information associated with the online entity, (ii) weighting the additional information and communications from the anonymized inbox and (iii) recalculating the PWI score for the digital persona based on a weighted value for the additional information and a weighted valued for the anonymized inbox. The communication alias may include at least one of a masked email address, a masked physical address, or a masked phone number or a masked credit card number.

In one embodiment, a system for managing digital personas for online services may include at least one physical processor and physical memory that includes computer-executable instructions that, when executed by the physical processor, cause the physical processor to (i) generate a digital persona and a persona wear indicator (PWI) score for a user of an anonymized inbox with a communication alias to use for an online entity, (ii) determine, based on one or more communication messages associated with the communication alias, that the online entity has leaked information associated with the digital persona, (iii) recalculate the PWI score for the digital persona based at least in part on the determination that the online entity has leaked the information, (iv) determine that the PWI score exceeds a privacy score threshold, and (v) in response to determining that the PWI score exceeds the privacy score threshold, perform a security action that protects privacy of the user.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) generate a digital persona and a persona wear indicator (PWI) score for a user of an anonymized inbox with a communication alias to use for an online entity, (ii) determine, based on one or more communication messages associated with the communication alias, that the online entity has leaked information associated with the digital persona, (iii) recalculate the PWI score for the digital persona based at least in part on the determination that the online entity has leaked the information, (iv) determine that the PWI score exceeds a privacy score threshold, and (v) in response to determining that the PWI score exceeds the privacy score threshold, perform a security action that protects privacy of the user.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for managing digital personas for online services. Existing privacy services may provide the ability to use aliases for different aspects of their online profiles or personas, such as emails and credit cards. However, such systems typically do not provide any type of metric to measure the usefulness or effectiveness of the digital persona with regards to online privacy. The systems and methods described herein may monitor the current effectiveness and usefulness of digital personas used in conjunction with online entities and may enable the system to free resources trapped in an inactive digital persona. In some examples, the systems may monitor an anonymized inbox of a user and data may be used to generate or identify digital personas used for online entities. The system may determine that data associated with the digital persona may have been leaked and may provide security actions to curb negative effects of the data leakage, such as replacing compromised information, deleting the compromised digital persona and generating a replacement persona, or the like. In some examples, a security response to determining that a digital persona has been compromised may involve creating one or more new accounts for services associated with the persona, updating one or more existing accounts for the services that are registered with the persona, etc. Continuous monitoring and management of the digital personas may limit the negative impact of data leakage for the user and safeguard their information for future use.

Figure 1:
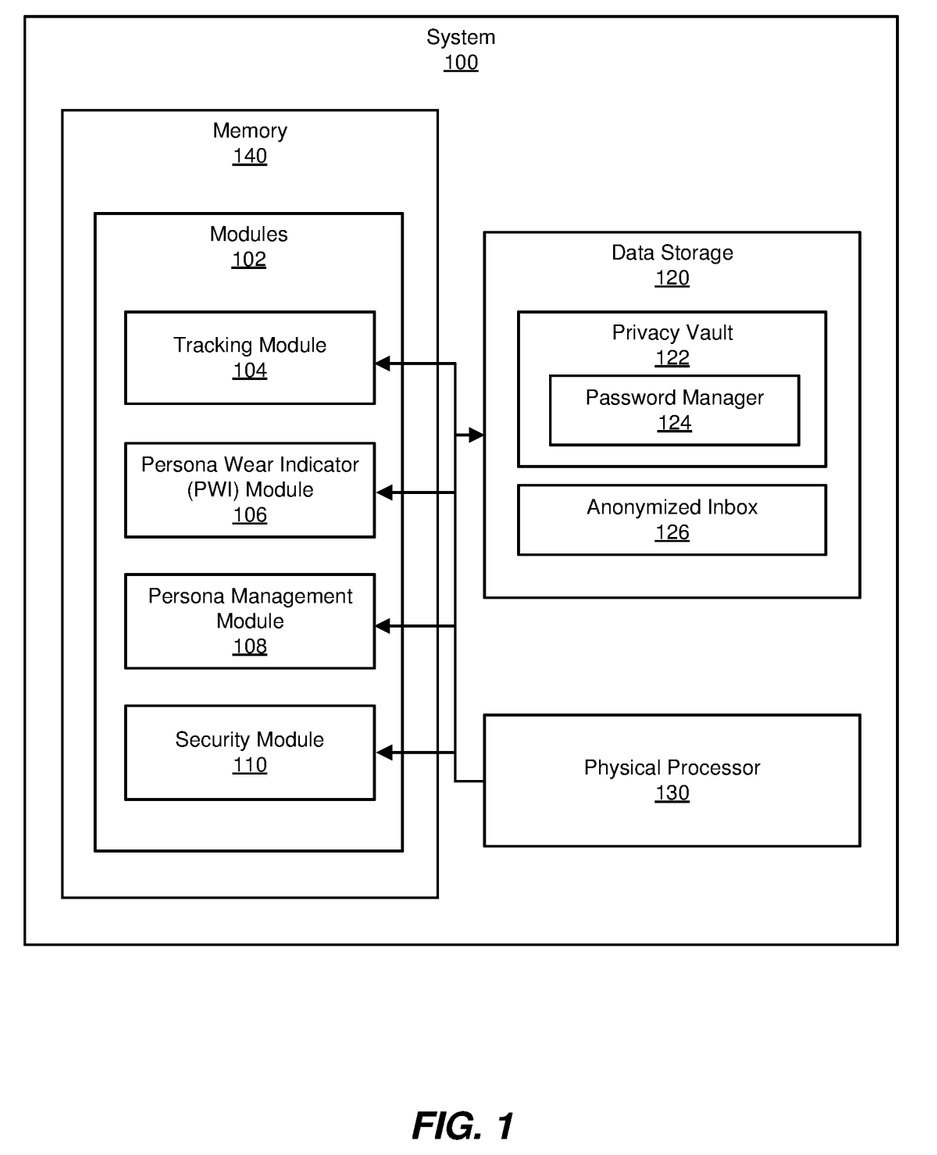
FIG. 1 is a block diagram of an example system for managing digital personas for online services.
Figure 2:
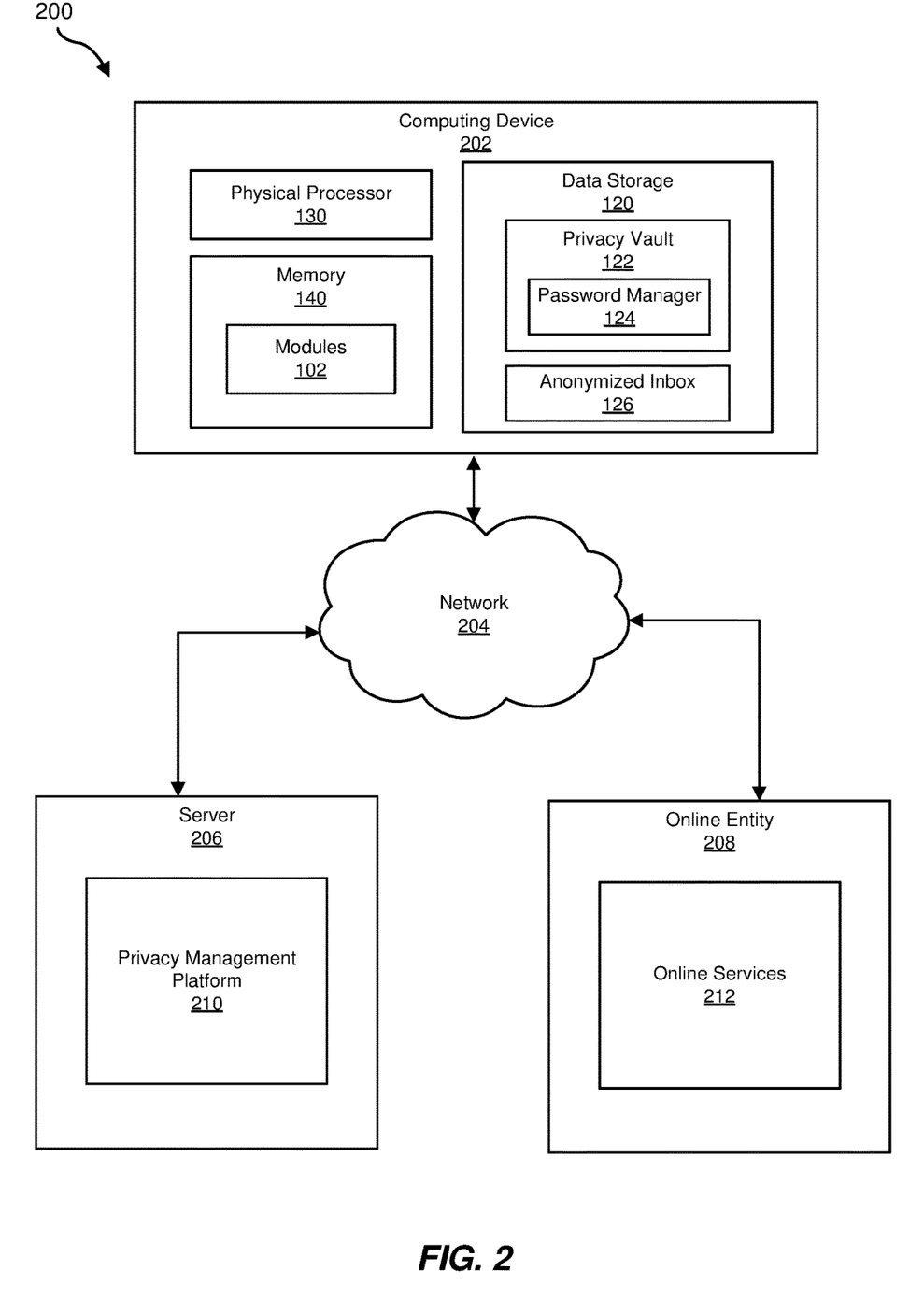
FIG. 2 is a block diagram of an additional example system for managing digital personas for online services.

The following will provide, with reference to FIGS. 1-2, detailed descriptions of example systems for managing digital personas for online services. Detailed descriptions of corresponding computer-implemented methods will also be provided in connection with FIGS. 3-4. A detailed description of data flow through the example system for managing digital personas for online services will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for managing digital personas for online services. As illustrated in this figure, example system 100 may include one or more modules 102 for performing one or more tasks. As will be explained in greater detail below, modules 102 may include a tracking module 104, a persona wear indicator (PWI) module 106, a persona management module 108, and a security module 110. Although illustrated as separate elements, one or more of the modules 102 in FIG. 1 may represent portions of a single module or application.

In certain embodiments, one or more of the modules 102 in FIG. 1 may represent one or more software applications or programs that, when executed by a computing device, may cause the computing device to perform one or more tasks. For example, and as will be described in greater detail below, one or more of the modules 102 may represent modules stored and configured to run on one or more computing devices, such as the devices illustrated in FIG. 2 (e.g., computing device 202, server 206, and/or online entity 208). One or more of the modules 102 in FIG. 1 may also represent all or portions of one or more special-purpose computers configured to perform one or more tasks.

As illustrated in FIG. 1, the example system 100 may also include one or more memory devices, such as memory 140. The memory 140 generally represents any type or form of volatile or non-volatile storage device or medium capable of storing data and/or computer-readable instructions. In one example, the memory 140 may store, load, and/or maintain one or more of the modules 102. Examples of the memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, the example system 100 may also include one or more physical processors, such as physical processor 130. The physical processor 130 generally represents any type or form of hardware-implemented processing unit capable of interpreting and/or executing computer-readable instructions. In one example, the physical processor 130 may access and/or modify one or more of the modules 102 stored in the memory 140. Additionally, or alternatively, the physical processor 130 may execute one or more of the modules 102 to facilitate managing digital personas for online services. Examples of the physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, the example system 100 may also include data storage 120. The data storage 120 generally represents any type or form of computing device capable of data storage. In one example, the data storage 120 may store a privacy vault 122 and/or an anonymized inbox 126. The privacy vault 122 may store a password manager 124.

The example system 100 in FIG. 1 may be implemented in a variety of ways. For example, all or a portion of the example system 100 may represent portions of the example system 200 in FIG. 2. As shown in FIG. 2, the system 200 may include a computing device 202 in communication with a server 206 and/or an online entity 208 via a network 204. In one example, all or a portion of the functionality of the modules 102 may be performed by the computing device 202, the server 206, the online entity 208, and/or any other suitable computing system. As will be described in greater detail below, one or more of the modules 102 from FIG. 1 may, when executed by at least one processor of the computing device 202, the server 206, and/or the online entity 208, enable the computing device 202, the server 206, and/or the online entity 208 to manage digital personas for online services. For example, and as will be described in greater detail below, one or more of the modules 102 may cause the computing device 202 and/or the server 206 to recite steps of method claim using FIG. 2

The computing device 202 generally represents any type or form of computing device capable of reading computer-executable instructions. For example, the computing device 202 may include an endpoint device (e.g., a mobile computing device) running privacy protection software. Additional examples of the computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

The server 206 generally represents any type or form of computing device capable of performing data-security operations (e.g., using modules 102). In some examples, the server 206 may be managed by a data-security provider of a security service and may represent a security server. In these examples, the server 206 may create and/or manage anonymized email aliases (e.g., via an anonymized inbox), masked telephone numbers, and/or masked credit card information. In one embodiment, the server 206 may analyze web content. For example, the server 206 may identify (1) trackers and/or advertisements on web pages, and/or (2) content within trackers, advertisements, new articles, and/or social media on webpages. In one embodiment, the server 206 may utilize tracker-crawlers to identify fingerprinting scripts served from various domains.

Additional examples of the server 206 include, without limitation, application servers, web servers, storage servers, and/or database servers configured to run certain software applications and/or provide various security, web, storage, and/or database services. Although illustrated as a single entity in FIG. 2, the server 206 may include and/or represent a plurality of servers that work and/or operate in conjunction with one another.

The online entity 208 generally represents any type or form of entity provide online services 212 and whose services, products, and/or content may be digitally accessed via the Internet. In some examples, the online entity 208 may represent an online vendor, such as an online retailer and/or an e-commerce marketplace provider. Additionally, or alternatively, the online entity 208 may represent an online service, such as a digital streaming service and/or an online banking service. In some examples, the online entity 208 may represent a website that receives login credentials from users.

The network 204 generally represents any medium or architecture capable of facilitating communication or data transfer. In one example, the network 204 may facilitate communication between the computing device 202 and the server 206. In this example, the network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Figure 3:
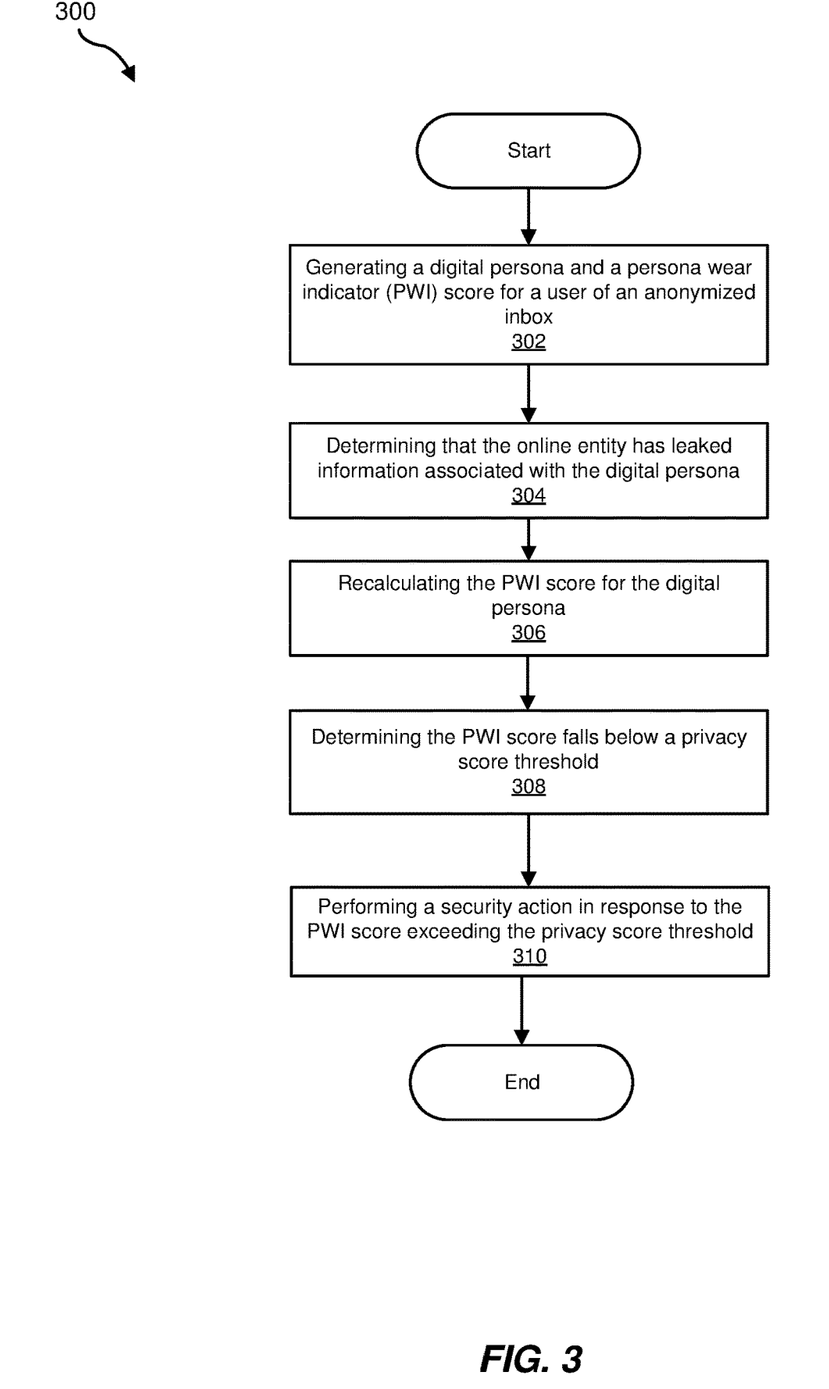
FIG. 3 is a flow diagram of an example method for managing digital personas for online services.

FIG. 3 is a flow diagram of an example computer-implemented method 300 for managing digital personas for online services. The steps shown in FIG. 3 may be performed by any suitable computer-executable code and/or computing system, including the system 100 in FIG. 1, the system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may generating a digital persona and a persona wear indicator (PWI) score for a user of an anonymized inbox with a communication alias to use for an online entity. The systems described herein may perform step 302 in any suitable manner. For example, the persona management module 108 may, as part of computing device 202 in FIG. 2, facilitate generation of a digital persona and a persona wear indicator (PWI) score for a user of an anonymized inbox 126 with a communication alias to use for an online entity 208. In some examples, the persona management module 108 may use information stored in a privacy vault 122, a password manager 124, and/or an anonymized inbox 126 to generate a digital persona.

The term "digital persona," or "online persona," as used herein, may generally refer to a mapping of information associated with the user that may be used to track communications and information between entities. In some examples, digital personas may be explicit digital profiles that are generated at the request or on behalf of a user. In some examples, the collection of personal data may be obtained through tracking different types of communications and transactions between users and entities. A digital persona may be used with more than one online entity and may include different types of personal information. Digital personas may include at least one identifier (e.g., communication alias, user identifier, masked financial information, etc.) that may be used to track and monitor information associated with the user. For example, a digital persona may include a masked credit card number. The masked credit card number may be used for different online entities and using different communication aliases or identifiers (e.g., a grocery store may use a phone number, an online store may use an email address, etc.). The common information across the different entities may be the masked credit card number, which may be used as the identifier to track where and how the masked credit card number has been used. Similarly, a communication alias (e.g., email alias, phone number alias, physical address alias, etc.) may be used across different online entities with different payment information (e.g., masked credit cards, banking information, etc.) or the like and may be used as the identifier tracked in the digital persona.

The term "privacy vault," as used herein, may generally refer to a secure datastore that contains user data. In some examples, the privacy vault may be an end-to-end encrypted datastore which is only accessible by the user. Examples of information that may be stored in the privacy vault may include credit card numbers, banking details, social security numbers, a password manager (e.g., as described below), emails, messages, and the like. The vault may be secured using any known data encryption techniques and may require multi-factor authentication to access.

The term "password manager," as used herein, generally refers to data management and storage to store logins, credit cards, contacts created under privacy policies, and the like. In some examples, the password manager may be stored within or in conjunction with a privacy vault. The password manager may be encrypted using any known encryption techniques and may store any mappings of masked aliases to existing protected data (e.g., mapping of communication aliases to existing emails, phone numbers, addresses, or similar.

The term "anonymized inbox," or "anonymized email inbox," as used herein, may generally refer to an email inbox created without using any real user information. The anonymized inbox may utilize communication aliases created in real time and may not directly map to a user. Emails in the anonymized inbox may be encrypted with a privacy key of the user and only be accessible by the user. In some examples, the anonymized inbox may be stored in a privacy vault or may be stored separate from the privacy vault and encrypted using different encryption techniques.

The term "communication alias," as used herein, may generally refer to any type or form of forwarding communication means (e.g., used in order to disguise a primary email address to which the communication alias forwards). The communication alias may be a mapping of a means of communication generated without using any user information which forwards communications to the anonymized inbox. Examples of means of communication may include emails addresses, phone numbers, physical addresses, and the like. For example, a user may want to sign-up at ABC store. The anonymized inbox address may be foobar@anoninbox.com. The persona management module 108 may generate a communication alias of digi123@anoninbox.comfor the user to use with ABC store, which forwards any communications received at digi123@anoninbox.com to foobar@anoninbox.com. The persona management module 108 may generate a different communication alias for a digital streaming provider, the email alias geteid03@anoninbox.com, which forwards to the anonymized inbox. With regards to a physical address, the persona management module 108 may identify a physical location, such as a drop box, to may be utilized for transactions but is not directly associated with the user. For example, the drop box may be managed by a third party and the user may access the drop box through credentials provided by the third party.

The term "masked credit card number," as used herein, generally refers to a security measure to generate a usable credit card number that is not directly associated with the user. In some examples, the masked credit card number may be a refillable or preloaded credit card number that is not directly associated with the user or any of their information but is tied to the digital persona.

The persona management module 108 may provide a user of an anonymized inbox with an email alias to use for a particular online entity. For example, the persona management module 108 may, as part of the computing device 202 and/or the server 206 in FIG. 2, provide a user of the anonymized inbox 126 with a communication alias to use for the online entity 208. In one example, the user may subscribe to a privacy product (e.g., offered by a security service of the privacy management platform 210 of the server 206) that includes an anonymized inbox service. In this example, the persona management module 108 may operate as part of the security service of the privacy management platform 210 and may provide the user with a communication alias as part of the anonymized inbox 126.

The persona management module 108 may provide the user with a communication alias in response to a variety of events. In one embodiment, the persona management module 108 may determine that a user is registering with (and/or subscribing to) online entity 208 and may automatically create a communication alias in response to making that determination. In this embodiment, the persona management module 108 may provide the user with the communication alias as part of a policy to create a new/unique email alias each time the user registers and/or subscribes with an online entity 208. In another embodiment, the persona management module 108 may create the communication alias in response to receiving user input requesting the same.

In some examples, the user may subscribe and/or register with a variety of online entities 208. In these examples, the persona management module 108 may provide the user with a different communication alias for each of the online entities 208.

In some embodiments in which the persona management module 108 operates as part of a security service of a privacy management platform 210 that manages the anonymized inbox 126 for the user, the security service may also provide the user with one or more additional security-related services. For example, the security service may also provide the user with masked credit card information and/or masked telephone numbers to use for online entities (e.g., to use for online entity 208).

The persona management module 108 may receive data from the tracking module 104, which may monitor the anonymized inbox 126. Examples of the types of information the tracking module 104 may monitor may include, but are not limited to, communications sent to the communication aliases (e.g. emails, text messages, phone calls, etc.), identity of online entities 208, identification of the online entities 208 communicating with a particular communication alias, and the like. Based on the information from the tracking module 104, the persona management module 108 may generate a digital persona, which may include at least one of the communication alias, a masked credit card number, a masked identifier, or the like. The digital persona may be a collection of metadata from the privacy vault that is stored as mappings in the data storage 120.

In some examples, the persona management module 108 may request that the PWI module 106 generate a PWI score for the digital persona. The persona management module 108 may transmit information obtained by the tracking module 104 to the PWI module 106. Using the information received from the persona management module 108, the PWI module 106 may generate a PWI score for the digital persona. In some examples, the initial PWI score may be based on the online entity 208 associated with the digital persona. For example, an online entity 208 may be associated with a reputation score indicative of the strength of its privacy protections and history. Examples of how to calculate a reputation score that may be used as a PWI score may be found in U.S. application Ser. No. 16/004,357, filed Jun. 9, 2018, the disclosure of which is incorporated, in its entirety, by this reference. In some examples, the digital persona and PWI score may be stored in a table or other storage element capable of maintaining the mapping in the data storage 120 of the system 100.

At step 304, one or more of the systems described herein may determine that the online entity has leaked information associated with the digital persona. The systems described herein may perform step 304 in any suitable manner. For example, the persona management module 108 may determine, based on one or more communication messages associated with the communication alias, that the online entity 208 has leaked information associated with the digital persona.

In some examples, the tracking module 104 may monitor the anonymized inbox 126 to identify communications that are sent to a communication alias. Examples of communications may include emails, text messages, phone calls, or the like. In some examples, the communication may be physical letters sent to a masked physical address, scanned, and transmitted to the anonymized inbox 126. In some examples, the tracking module 104 may identify the communications sent to the communication alias from different online entities 208 while monitoring the anonymized inbox 126.

The tracking module 104 may tag and/or categorize the communications that are transmitted to the anonymized inbox 126. For example, the tracking module 104 may analyze the communications and determine whether they should be tagged as solicited or non-solicited communications. This may be determined by the tracking module 104 based on the online entities 208 that the user chose to share the communication alias. For example, if the communication alias digi123@anoninbox.com was generated and shared by the user to use with ABC store, if communications are received at the communication alias from a different online entity 208, such as XYZ service, the communication may be tagged as unsolicited. Additionally, the online entity 208 ABC store may be tagged as having leaked information. This may lead to the application of additional policies and processing to communications with the ABC store, as it has now been categorized as an entity that may have leaked user information.

At step 306, one or more of the systems described herein may recalculate the PWI score for the digital persona based at least in part on the determination that the online entity has leaked the information. The systems described herein may perform step 306 in any suitable manner. For example, the persona management module 108 may request the PWI module 106 recalculate the PWI score for the digital persona based at least in part on the determination that the online entity 208 has leaked the information.

In some examples, the persona management module 108 may obtain data from the tracking module 104 of the tagged and/or categorized communications. The persona management module 108 may weight (e.g., assign a weighted value) the tagged communications from the anonymized inbox and may use the weight of the tagged communications in recalculating the PWI score of the digital persona. For example, unwanted (e.g., unsolicited) activity on a masked credit card number may raise an immediate alarm for the user (e.g., a user may be notified immediately) and may carry a very high weight. Similarly, unsolicited activity on a phone number may carry a higher weight than unsolicited email.

In some examples, the persona management module 108 may receive additional information associated with the online entity 208. Additional feeds related to breaches on a known domain could be additional inputs and be afforded higher weight in the recalculation of the PWI score for the digital persona. In some examples, the additional information may be provided by third party monitoring services or by a service of the privacy management platform 210. For example, information may be provided by an ad tracker/blocker, which may maintain a database of domains under the same owner which may be used in the recalculation of the PWI score.

The PWI score may be recalculated at various times and/or in response to various triggers. For example, recalculation of the PWI score for the digital persona may be updated in real-time as information becomes available to the persona management module 108, at periodic intervals of time, or the like. In some embodiments, recalculation of the PWI score may be triggered by and/or based on a user's usage of the digital persona. For example, the PWI score calculation may take into account that a user has stopped using a persona that is still receiving communication from registered vendors. Furthermore, in some embodiments, recalculation of the PWI score may take a user's actions on incoming traffic into account. For example, a PWI score may take into account that a user has stopped responding to traffic from a particular service or vendor using the digital persona but that the user is still be responding to other traffic (e.g., calls or emails from other vendors) associated with the digital persona.

At step 308, one or more of the systems described herein may determine that the PWI score exceeds a privacy score threshold. The systems described herein may perform step 308 in any suitable manner. For example, the persona management module 108 may receive the recalculated PWI score for the digital persona from the PWI module 106. The persona management module 108 may compare the recalculated PWI score for the digital persona with a privacy score threshold. In some examples, the privacy score threshold may be a value set by an administrator or the user. The privacy score threshold may be calculated by the persona management module 108 using historic user data or data obtained from the privacy management platform 210, which may include anonymized historic data from the user and/or other users of the system. Based on one or more security policies, the persona management module 108 may determine that the PWI score exceeds a privacy score threshold. In response to determining that the PWI score of the digital persona exceeds the privacy score threshold, the persona management module 108 may transmit instructions to the security module 110 to perform a security action.

At step 310, one or more of the systems described herein may, in response to determining that the PWI score exceeds the privacy score threshold, perform a security action that protects privacy of the user. The systems described herein may perform step 310 in any suitable manner. For example, the security module 110 may, in response to determining that the PWI score exceeds the privacy score threshold, perform a security action that protects privacy of the user. For example, the security module 110 may receive an indication from the persona management module 108 that the PWI score of the digital persona exceeds the privacy score threshold. The security module 110, in response to a determination that the PWI score of the digital persona exceeds the privacy score, may perform a security action that protects the privacy of the user. Examples of the security action may include modifying the digital persona, deleting the digital persona, or not taking any action at the request of the user. The process of performing security actions is further discussed below in relation to FIG. 4.

Figure 4:
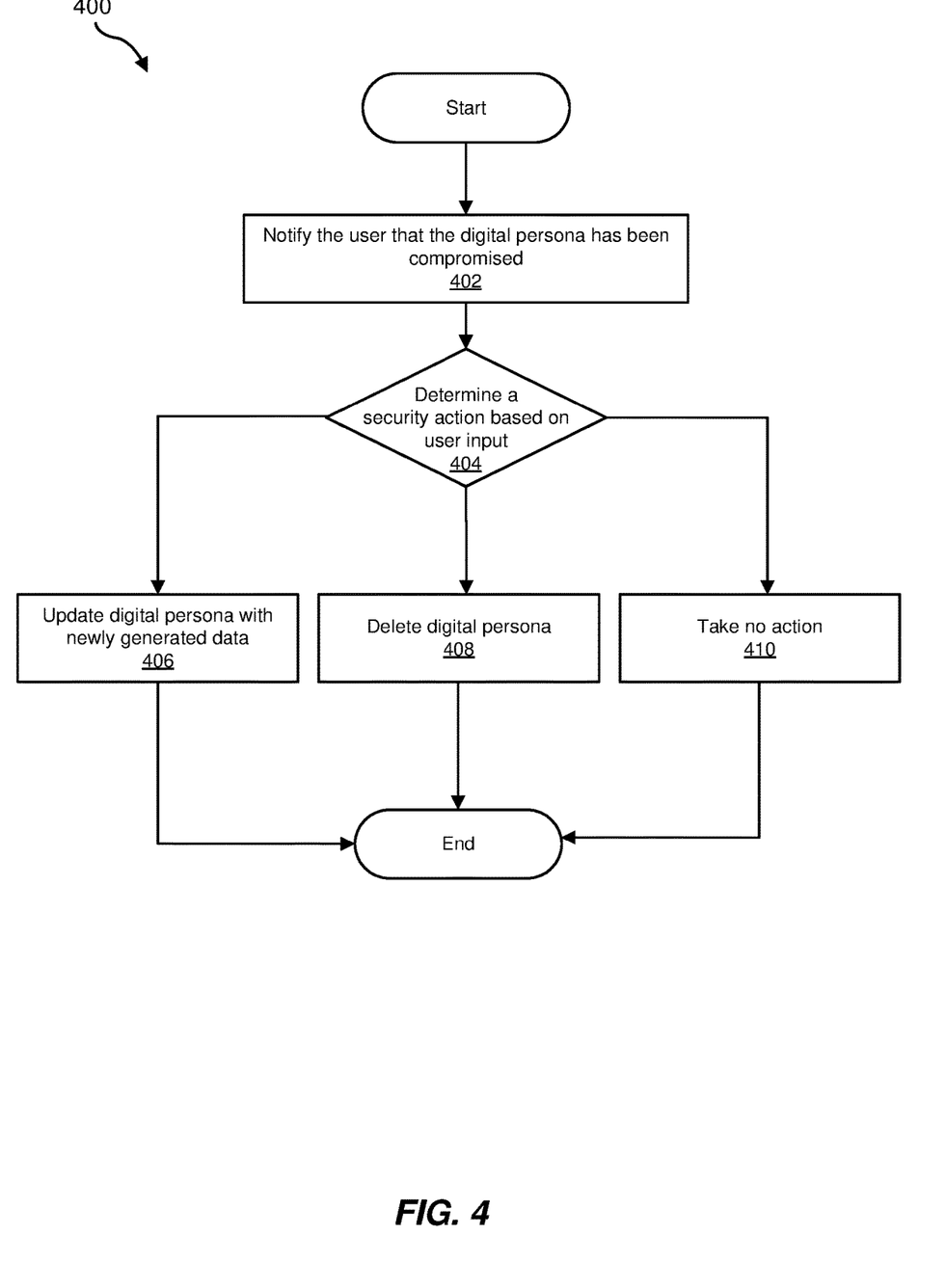
FIG. 4 is a flow diagram of another example method for managing digital personas for online services.

FIG. 4 is a flow diagram of another example computer-implemented method 400 for managing digital personas for online services. The steps shown in FIG. 4 may be performed by any suitable computer-executable code and/or computing system, including the system 100 in FIG. 1, the system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402 one or more of the systems described herein may notify the user that the digital persona has been compromised. The systems described herein may perform step 402 in any suitable manner. For example, the security module 110 may, as part of computing device 202 in FIG. 2, display a notification for the user on the computing device 202. In some examples, the notification may include information about the digital persona that has been compromised, such as the communication alias or other information associated with the digital persona used to track information. The notification may identify one or more online entities that are associated with the digital persona and the type of action that compromised the digital persona (e.g., leakage of financial information, leakage of personally identifying information, sharing of communication alias, or the like).

In some examples, the notification may include a link to additional information associated with the compromised digital persona. This may include identification of the online entities 208 associated with the compromised digital persona, information indicating how the leakage of information was identified (e.g., third party service, monitoring the anonymized inbox 126, use of a masked credit card number or communication alias by an unknown online entity, or the like).

In some examples, security module 110 may generate the notification and facilitate the display of the notification on the computing device 202. The notification may be a dialog box, a pop-up notification, a banner, a text message, an email message, voice message, or any other type of communication used to provide the user with information.

At step 404, one or more of the systems described herein may determine a security action based on user input. The systems described herein may perform step 404 in any suitable manner. For example, the security module 110 may, include one or more recommended security actions in the notification displayed to the user. The notification may enable the user to select a recommended security action. The security module 110 may receive an indication from the user of a selection of a recommended security action. For example, the user may select a button displayed in the notification and associated with a particular security action. Selection of the button may generate an indication that the user has selected the particular security action. Similarly, the notification may include a link to a webpage that lists one or more recommended security actions. The user may select an option associated with a security action on the webpage (e.g., checkbox, radio button, etc.) and submit the selection. In response to the submission, the webpage may generate a message or notification to transmit to the security module 110 indicating the selection of a security action.

At step 406, one or more of the systems described herein may update the digital persona with newly generated data. The systems described herein may perform step 406 in any suitable manner. For example, the security module 110 may, in response to receiving an indication from the user, update the compromised digital persona with newly generated data to replace data that has been determined to have been leaked or otherwise compromised. For example, in response to the persona management module 108 determining that the communication alias was compromised, the security module 110 may update the compromised digital persona with a newly generated communication alias (e.g., email alias, phone number alias, physical address alias, etc.).

Similarly, if the persona management module 108 determines that a masked credit card number has been compromised, the security module 110 may update the compromised digital persona with a newly generated masked credit card number.

In some embodiments, with a user's consent, updates to a digital persona may be performed in an automated fashion. For example, emails, phone numbers, and/or credit card numbers associated with a digital persona be updated automatically for the digital persona and/or any online services associated with the digital persona. Furthermore, a digital persona may be used to trigger General Data Protection Regulation (GDPR) requests and/or requests associated with other data privacy laws. A digital personal may also include user-approved rules for when to deleting a user's data with online services or vendors.

At step 408, one or more of the systems described herein may delete the digital persona. The systems described herein may perform step 408 in any suitable manner. For example, the security module 110 may, in response to receiving an indication from the user, delete the digital persona that has been determined to have been leaked or otherwise compromised. In some examples, the persona management module 108 may automatically generate a new digital persona to replace the deleted digital persona. In some examples, the persona management module 108 may contact the user to determine whether or not to generate a new digital persona to replace the deleted digital persona.

At step 410, one or more of the systems described herein may take no security action. The systems described herein may perform step 410 in any suitable manner. For example, the security module 110 may, in response to receiving an indication from the user, take no action in response to the digital persona determined to be compromised. In some examples, the persona management module 108 may flag the compromised digital persona. The persona management module 108 may continue to notify the user regarding any additional information indicating further leakage of information from the compromised digital persona. In some examples, the persona management module 108 may automatically perform a security action if the PWI module 106 determines that the PWI associated with the compromised digital persona exceeds a threshold.

Figure 5:
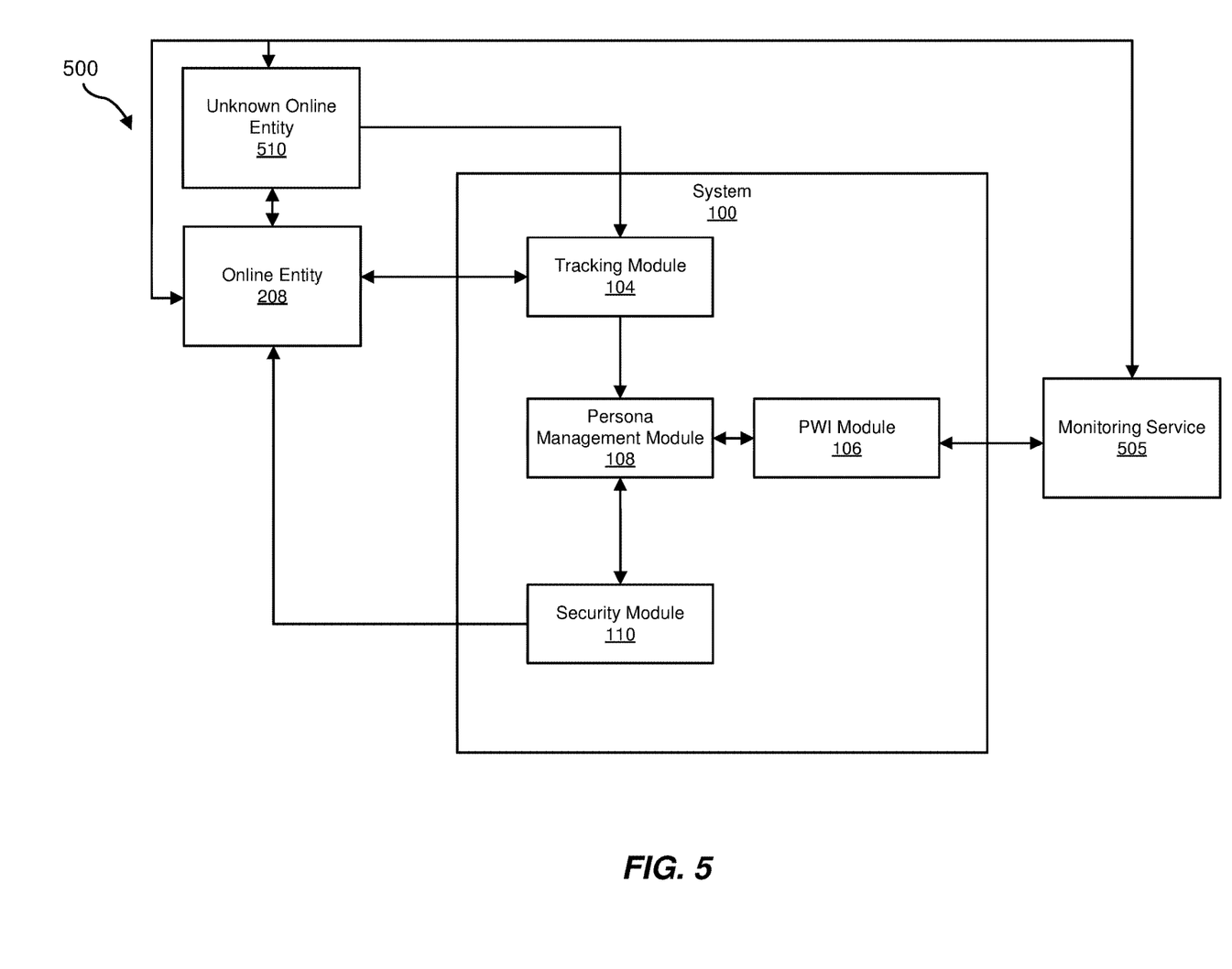
FIG. 5 is a data flow diagram of an example system for managing digital personas for online services.

FIG. 5 is a data flow diagram of an example system for managing digital personas for online services. The example system 100 in FIG. 1 may be implemented in a variety of ways. For example, all or a portion of the example system 100 may represent portions of the system 500 in FIG. 5. As will be described in greater detail below, one or more of the modules 102 from FIG. 1 may, when executed by at least one processor of the computing device 202 or the server 206, enable the system 500 to manage digital personas for online services. For example, and as will be described in greater detail herein, one or more of the modules 102 may cause the example system 500 to generate, by the persona management module 108, a digital persona using information tracked by the tracking module 104. The information may be obtained from the user of the system 100 as well as one or more online entities 208. Digital personas may include a communication alias, financial data, identifiers, or other types of information that may be used to track data flow between entities, such as a transaction between the system 100 and online entity 208.

The persona management module 108 may communicate with the PWI module 106 to generate a PWI score for the user of the anonymized inbox 126. In some examples, the PWI module 106 may generate a PWI score for the digital persona using information tracked by the tracking module 104 and/or a monitoring service 505. The monitoring service 505 may provide information about privacy breaches or leakage of online entities, such as online entity 208 and/or unknown online entity 510. Online entity 208 generally represents online services, service providers, vendors, etc. that may be associated with a digital persona, and unknown online entity 510 may generally represent an entity (e.g., a malicious entity) that has obtained unauthorized access to all or a portion of the digital persona associated with online entity 208.

In some examples, the persona management module 108 may determine that the online entity 208 has leaked information associated with the digital persona. The persona management module 108 may cause the PWI module 106 to recalculate the PWI score for the digital persona based at least in part on the determination that the online entity has leaked the information. The persona management module 108 may determine that the PWI score for the digital persona exceeds a privacy score threshold. In response to determining that the PWI score exceeds the privacy score threshold, the security module 110 may perform a security action that protects privacy of the user.

The systems and methods described herein are directed to managing digital personas for online services. Conventional privacy services may allow users to use aliases for different aspects of their profiles, such as emails and credit cards. Unfortunately, existing systems do not provide any type of metric to measure the usefulness or effectiveness of the digital persona with regards to online privacy and do not provide the ability for a fresh clean state start for the user with existing and new services. The systems and methods described herein may monitor the current effectiveness and usefulness of digital personas used in conjunction with online entities and may enable the system to free resources trapped in an inactive persona. In some examples, an anonymized inbox of a user may be monitored, and data may be used to generate or identify digital personas used for online entities. The system may determine that data associated with the digital persona may have been leaked and may provide security actions to curb negative effects of the data leakage. Continuous monitoring and management of the digital personas may limit the negative impact of data leakage for the user.

Figure 6:
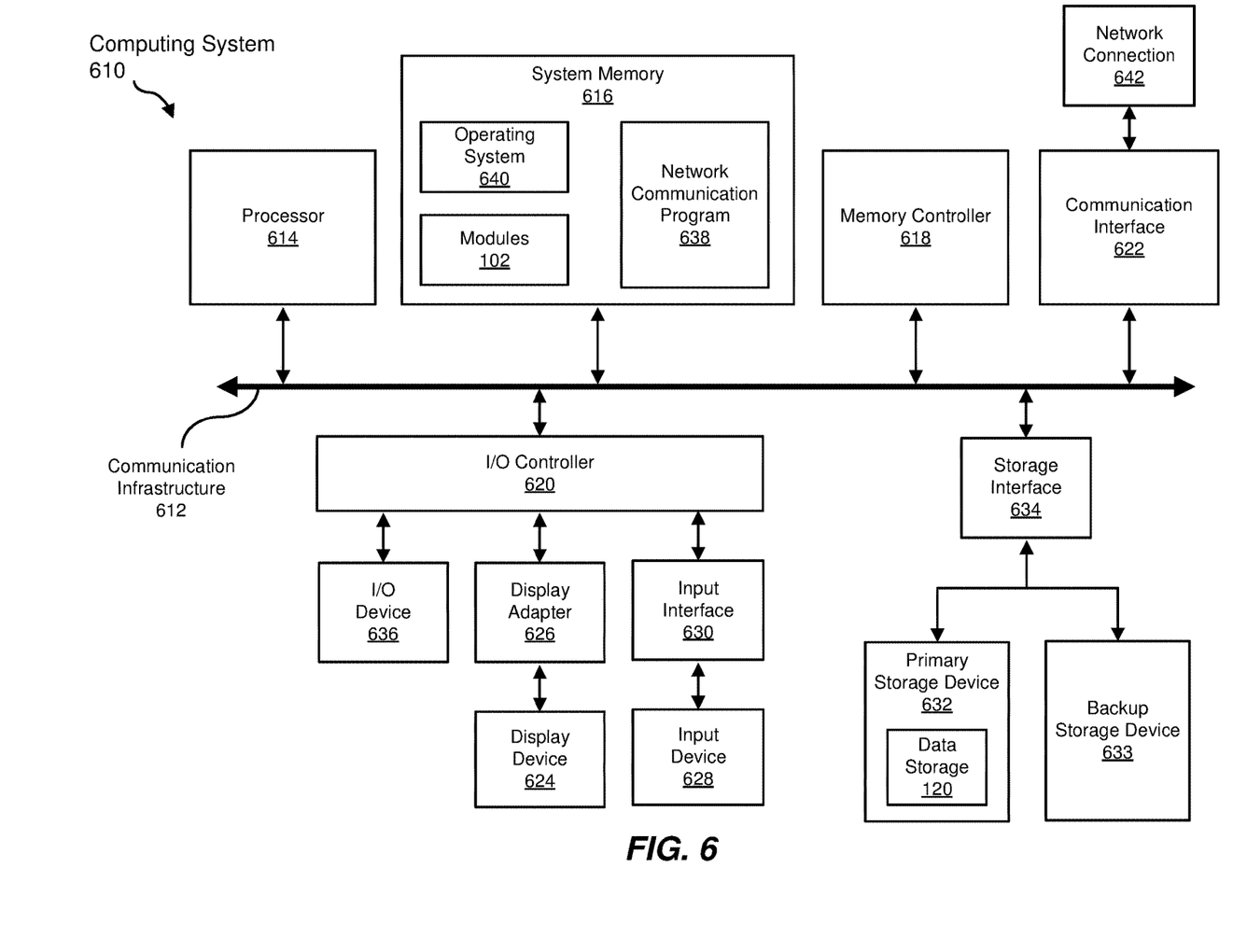
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of the computing system 610 may perform and/or be a means for performing, either alone or in combination with other elements, one or more of the steps described herein (such as one or more of the steps illustrated in FIGS. 3-4). All or a portion of the computing system 610 may also perform and/or be a means for performing any other steps, methods, or processes described and/or illustrated herein.

The computing system 610 broadly represents any single or multi-processor computing device or system capable of executing computer-readable instructions. Examples of the computing system 610 include, without limitation, workstations, laptops, client-side terminals, servers, distributed computing systems, handheld devices, or any other computing system or device. In its most basic configuration, the computing system 610 may include at least one processor 614 and a system memory 616.

The processor 614 generally represents any type or form of physical processing unit (e.g., a hardware-implemented central processing unit) capable of processing data or interpreting and executing instructions. In certain embodiments, the processor 614 may receive instructions from a software application or module. These instructions may cause the processor 614 to perform the functions of one or more of the example embodiments described and/or illustrated herein.

The system memory 616 generally represents any type or form of volatile or non-volatile storage device or medium capable of storing data and/or other computer-readable instructions. Examples of the system memory 616 include, without limitation, Random Access Memory (RAM), Read Only Memory (ROM), flash memory, or any other suitable memory device. Although not required, in certain embodiments the computing system 610 may include both a volatile memory unit (such as, for example, the system memory 616) and a non-volatile storage device (such as, for example, the primary storage device 632, as described in detail below). In one example, one or more of the modules 102 from FIG. 1 may be loaded into the system memory 616.

In some examples, the system memory 616 may store and/or load an operating system 640 for execution by the processor 614. In one example, the operating system 640 may include and/or represent software that manages computer hardware and software resources and/or provides common services to computer programs and/or applications on the computing system 610. Examples of the operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, the example computing system 610 may also include one or more components or elements in addition to the processor 614 and the system memory 616. For example, as illustrated in FIG. 6, the computing system 610 may include a memory controller 618, an Input/Output (I/O) controller 620, and a communication interface 622, each of which may be interconnected via a communication infrastructure 612. The communication infrastructure 612 generally represents any type or form of infrastructure capable of facilitating communication between one or more components of a computing device. Examples of the communication infrastructure 612 include, without limitation, a communication bus (such as an Industry Standard Architecture (ISA), Peripheral Component Interconnect (PCI), PCI Express (PCIe), or similar bus) and a network.

The memory controller 618 generally represents any type or form of device capable of handling memory or data or controlling communication between one or more components of the computing system 610. For example, in certain embodiments, the memory controller 618 may control communication between the processor 614, the system memory 616, and the I/O controller 620 via the communication infrastructure 612.

The I/O controller 620 generally represents any type or form of module capable of coordinating and/or controlling the input and output functions of a computing device. For example, in certain embodiments, the I/O controller 620 may control or facilitate transfer of data between one or more elements of the computing system 610, such as the processor 614, the system memory 616, the communication interface 622, the display adapter 626, the input interface 630, and the storage interface 634.

As illustrated in FIG. 6, the computing system 610 may also include at least one display device 624 coupled to the I/O controller 620 via a display adapter 626. The display device 624 generally represents any type or form of device capable of visually displaying information forwarded by the display adapter 626. Similarly, the display adapter 626 generally represents any type or form of device configured to forward graphics, text, and other data from the communication infrastructure 612 (or from a frame buffer, as known in the art) for display on the display device 624.

As illustrated in FIG. 6, the example computing system 610 may also include at least one input device 628 coupled to I/O controller 620 via an input interface 630. Input device 628 generally represents any type or form of input device capable of providing input, either computer or human generated, to the example computing system 610. Examples of the input device 628 include, without limitation, a keyboard, a pointing device, a speech recognition device, variations or combinations of one or more of the same, and/or any other input device.

Additionally, or alternatively, the example computing system 610 may include additional I/O devices. For example, the example computing system 610 may include the I/O device 636. In this example, the I/O device 636 may include and/or represent a user interface that facilitates human interaction with the computing system 610. Examples of the I/O device 636 include, without limitation, a computer mouse, a keyboard, a monitor, a printer, a modem, a camera, a scanner, a microphone, a touchscreen device, variations or combinations of one or more of the same, and/or any other I/O device.

The communication interface 622 broadly represents any type or form of communication device or adapter capable of facilitating communication between the example computing system 610 and one or more additional devices. For example, in certain embodiments, the communication interface 622 may facilitate communication between the computing system 610 and a private or public network including additional computing systems. Examples of the communication interface 622 include, without limitation, a wired network interface (such as a network interface card), a wireless network interface (such as a wireless network interface card), a modem, and any other suitable interface. In at least one example, the communication interface 622 may provide a direct connection to a remote storage device via a direct link to a network, such as the Internet. The communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, the communication interface 622 may also represent a host adapter configured to facilitate communication between the computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. The communication interface 622 may also allow the computing system 610 to engage in distributed or remote computing. For example, the communication interface 622 may receive instructions from a remote device or send instructions to a remote device for execution.

In some examples, the system memory 616 may store and/or load a network communication program 638 for execution by the processor 614. In one example, the network communication program 638 may include and/or represent software that enables the computing system 610 to establish a network connection 642 with another computing system (not illustrated in FIG. 6) and/or communicate with the other computing system by way of the communication interface 622. In this example, the network communication program 638 may direct the flow of outgoing traffic that is sent to the other computing system via the network connection 642. Additionally, or alternatively, the network communication program 638 may direct the processing of incoming traffic that is received from the other computing system via the network connection 642 in connection with the processor 614.

Although not illustrated in this way in FIG. 6, the network communication program 638 may alternatively be stored and/or loaded in the communication interface 622. For example, the network communication program 638 may include and/or represent at least a portion of software and/or firmware that is executed by a processor and/or Application Specific Integrated Circuit (ASIC) incorporated in the communication interface 622.

As illustrated in FIG. 6, the example computing system 610 may also include a primary storage device 632 and a backup storage device 633 coupled to the communication infrastructure 612 via a storage interface 634. The storage devices 632 and 633 generally represent any type or form of storage device or medium capable of storing data and/or other computer-readable instructions. For example, the storage devices 632 and 633 may be a magnetic disk drive (e.g., a so-called hard drive), a solid state drive, a floppy disk drive, a magnetic tape drive, an optical disk drive, a flash drive, or the like. The storage interface 634 generally represents any type or form of interface or device for transferring data between the storage devices 632 and 633 and other components of the computing system 610. In one example, the privacy vault 122, password manager 124, and the anonymized inbox 126 from FIG. 1 may be stored and/or loaded in the primary storage device 632.

In certain embodiments, the storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. The storage devices 632 and 633 may also include other similar structures or devices for allowing computer software, data, or other computer-readable instructions to be loaded into the computing system 610. For example, the storage devices 632 and 633 may be configured to read and write software, data, or other computer-readable information. The storage devices 632 and 633 may also be a part of the computing system 610 or may be a separate device accessed through other interface systems.

Many other devices or subsystems may be connected to the computing system 610. Conversely, all of the components and devices illustrated in FIG. 6 need not be present to practice the embodiments described and/or illustrated herein. The devices and subsystems referenced above may also be interconnected in different ways from that shown in FIG. 6. The computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions.

Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into the computing system 610. All or a portion of the computer program stored on the computer-readable medium may then be stored in the system memory 616 and/or various portions of the storage devices 632 and 633. When executed by the processor 614, a computer program loaded into the computing system 610 may cause the processor 614 to perform and/or be a means for performing the functions of one or more of the example embodiments described and/or illustrated herein. Additionally, or alternatively, one or more of the example embodiments described and/or illustrated herein may be implemented in firmware and/or hardware. For example, the computing system 610 may be configured as an Application Specific Integrated Circuit (ASIC) adapted to implement one or more of the example embodiments disclosed herein.

Figure 7:
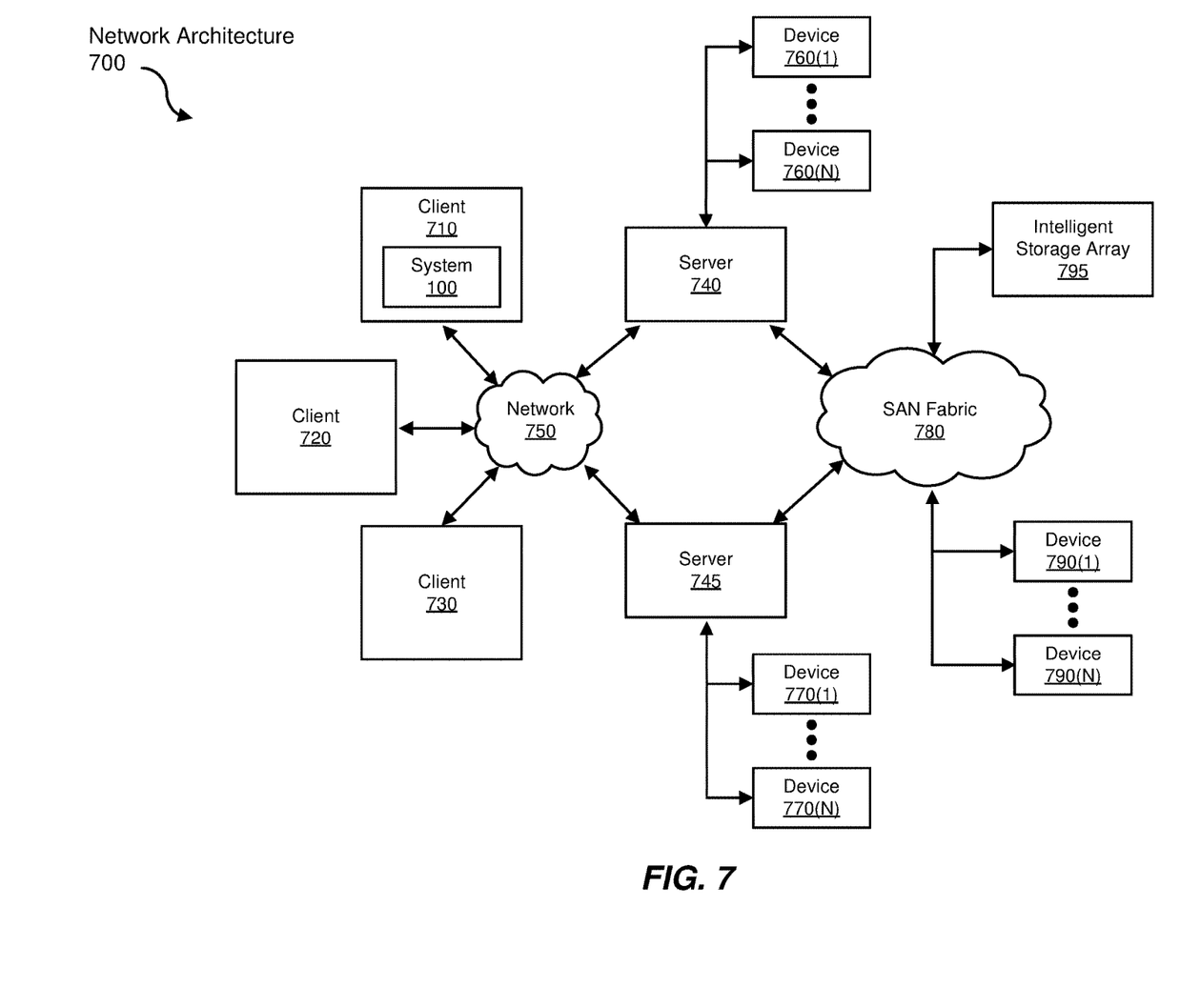
FIG. 7 is a block diagram of an example computing network capable of implementing one or more of the embodiments described and/or illustrated herein.

FIG. 7 is a block diagram of an example network architecture 700 in which the client systems 710, 720, and 730 and the servers 740 and 745 may be coupled to a network 750. As detailed above, all or a portion of the network architecture 700 may perform and/or be a means for performing, either alone or in combination with other elements, one or more of the steps disclosed herein (such as one or more of the steps illustrated in FIGS. 3-6). All or a portion of the network architecture 700 may also be used to perform and/or be a means for performing other steps and features set forth in the instant disclosure.

The client systems 710, 720, and 730 generally represent any type or form of computing device or system, such as the example computing system 610 in FIG. 6. Similarly, the servers 740 and 745 generally represent computing devices or systems, such as application servers or database servers, configured to provide various database services and/or run certain software applications. The network 750 generally represents any telecommunication or computer network including, for example, an intranet, a WAN, a LAN, a PAN, or the Internet. In one example, the client systems 710, 720, and/or 730 and/or the servers 740 and/or 745 may include all or a portion of the system 100 from FIG. 1.

As illustrated in FIG. 7, the one or more storage devices 760(1)-(N) may be directly attached to the server 740. Similarly, the one or more storage devices 770(1)-(N) may be directly attached to the server 745. The storage devices 760(1)-(N) and the storage devices 770(1)-(N) generally represent any type or form of storage device or medium capable of storing data and/or other computer-readable instructions. In certain embodiments, the storage devices 760(1)-(N) and the storage devices 770(1)-(N) may represent Network-Attached Storage (NAS) devices configured to communicate with the servers 740 and 745 using various protocols, such as Network File System (NFS), Server Message Block (SMB), or Common Internet File System (CIFS).

The servers 740 and 745 may also be connected to a Storage Area Network (SAN) fabric 780. The SAN fabric 780 generally represents any type or form of computer network or architecture capable of facilitating communication between a plurality of the storage devices. The SAN fabric 780 may facilitate communication between the servers 740 and 745 and a plurality of the storage devices 790(1)-(N) and/or an intelligent storage array 795. The SAN fabric 780 may also facilitate, via the network 750 and the servers 740 and 745, communication between the client systems 710, 720, and 730 and the storage devices 790(1)-(N) and/or the intelligent storage array 795 in such a manner that the devices 790(1)-(N) and the array 795 appear as locally attached devices to the client systems 710, 720, and 730. As with the storage devices 760(1)-(N) and the storage devices 770(1)-(N), the storage devices 790(1)-(N) and the intelligent storage array 795 generally represent any type or form of storage device or medium capable of storing data and/or other computer-readable instructions.

In certain embodiments, and with reference to the example computing system 610 of FIG. 6, a communication interface, such as the communication interface 622 in FIG. 6, may be used to provide connectivity between each client system 710, 720, and 730 and the network 750. The client systems 710, 720, and 730 may be able to access information on the server 740 or 745 using, for example, a web browser or other client software. Such software may allow the client systems 710, 720, and 730 to access data hosted by the server 740, the server 745, the storage devices 760(1)-(N), the storage devices 770(1)-(N), the storage devices 790(1)-(N), or the intelligent storage array 795. Although FIG. 7 depicts the use of a network (such as the Internet) for exchanging data, the embodiments described and/or illustrated herein are not limited to the Internet or any particular network-based environment.

In at least one example, all or a portion of one or more of the example embodiments disclosed herein may be encoded as a computer program and loaded onto and executed by the server 740, the server 745, the storage devices 760(1)-(N), the storage devices 770(1)-(N), the storage devices 790(1)-(N), the intelligent storage array 795, or any combination thereof. All or a portion of one or more of the example embodiments disclosed herein may also be encoded as a computer program, stored in the server 740, run by the server 745, and distributed to the client systems 710, 720, and 730 over the network 750.

As detailed above, the computing system 610 and/or one or more components of the network architecture 700 may perform and/or be a means for performing, either alone or in combination with other elements, one or more steps of an example method for managing digital personas for online services.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of the example system 100 in FIG. 1 may represent portions of a cloud-computing or network-based environment. The cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of the example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of the example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally, or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of the example system 100 in FIG. 1 may represent portions of a mobile computing environment. The mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of the example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of the example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of the example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing digital personas for online services, at least a portion of the method being performed by a computing device comprising at least one processor, the method comprising:
   generating a digital persona and a persona wear indicator (PWI) score for a user of an anonymized inbox with a communication alias to use for an online entity;
   determining, based on one or more communication messages associated with the communication alias, that the online entity has leaked information associated with the digital persona;
   recalculating the PWI score for the digital persona based at least in part on the determination that the online entity has leaked the information;
   recalculating the PWI score for the digital persona based on a weighted value;
   determining that the PWI score exceeds a privacy score threshold; and
   in response to determining that the PWI score exceeds the privacy score threshold, performing a security action that protects privacy of the user.

2. The computer-implemented method of claim 1, wherein the security action comprises:
   notifying the user that the digital persona has been compromised; and
   deleting the digital persona in response to receiving an indication from the user.

3. The computer-implemented method of claim 1, wherein the security action comprises:
   notifying the user that the digital persona has been compromised; and
   replacing data of the digital persona with newly generated data.

4. The computer-implemented method of claim 1, wherein the digital persona comprises at least one of the communication alias, a masked credit card number, or a masked identifier.

5. The computer-implemented method of claim 1, further comprising:
   weighting one or more tagged communications from the anonymized inbox,
   wherein recalculating the PWI score for the digital persona based on the weighted value corresponds to recalculating the PWI score for the digital persona based on a weighted value for the one or more tagged communications from the anonymized inbox.

6. The computer-implemented method of claim 1, wherein recalculating the PWI score for the digital persona further comprises:
   receiving additional information associated with the online entity; and
   weighting the additional information and communications from the anonymized inbox,
   wherein recalculating the PWI score for the digital persona based on the weighted value corresponds to recalculating the PWI score for the digital persona based on a weighted value for the additional information and a weighted valued for the anonymized inbox.

7. The computer-implemented method of claim 1, wherein the communication alias comprises at least one of a masked email address, a masked physical address, or a masked phone number.

8. A computer-implemented method for managing digital personas for online services, at least a portion of the method being performed by a computing device comprising at least one processor, the method comprising:
   generating a digital persona and a persona wear indicator (PWI) score for a user of an anonymized inbox with a communication alias to use for an online entity;
   determining, based on one or more communication messages associated with the communication alias, that the online entity has leaked information associated with the digital persona, wherein determining that the online entity has leaked information associated with the digital persona comprises:
     monitoring the anonymized inbox to identify communications that are sent to the communication alias;
     tagging the communications that are sent to the communication alias as solicited or unsolicited; and
     identifying the communications sent to the communication alias from different entities while monitoring the anonymized inbox;
   recalculating the PWI score for the digital persona based at least in part on the determination that the online entity has leaked the information;
   determining that the PWI score exceeds a privacy score threshold; and
   in response to determining that the PWI score exceeds the privacy score threshold, performing a security action that protects privacy of the user.

9. A system for managing digital personas for online services, the system comprising:
   at least one physical processor;
   physical memory comprising computer-executable instructions that, when executed by the physical processor, cause the physical processor to:
     generate a digital persona and a persona wear indicator (PWI) score for a user of an anonymized inbox with a communication alias to use for an online entity;
     determine, based on one or more communication messages associated with the communication alias, that the online entity has leaked information associated with the digital persona;
     recalculate the PWI score for the digital persona based at least in part on the determination that the online entity has leaked the information;
     recalculate the PWI score for the digital persona based on a weighted value;
     determine that the PWI score exceeds a privacy score threshold; and
     in response to determining that the PWI score exceeds the privacy score threshold, perform a security action that protects privacy of the user.

10. The system of claim 9, wherein the security action comprises:
    notifying the user that the digital persona has been compromised; and
    deleting the digital persona in response to receiving an indication from the user.

11. The system of claim 9, wherein the security action comprises:
notifying the user that the digital persona has been compromised; and
replacing data of the digital persona with newly generated data.

12. The system of claim 9, wherein the digital persona comprises at least one of the communication alias, a masked credit card number, or a masked identifier.

13. The system of claim 9, wherein the computer-executable instructions further cause the physical processor to:
weight one or more tagged communications from the anonymized inbox,
wherein the instructions cause the at least one physical processor to recalculate the PWI score for the digital persona based on the weighted value by recalculating the PWI score for the digital persona based on a weighted value for the one or more tagged communications from the anonymized inbox.

14. The system of claim 9, wherein, to recalculate the PWI score for the digital persona, the computer-executable instructions further cause the physical processor to:
receive additional information associated with the online entity; and
weight the additional information and communications from the anonymized inbox
wherein the instructions cause the at least one physical processor to recalculate the PWI score for the digital persona based on the weighted value by recalculating the PWI score for the digital persona based on a weighted value for the additional information and a weighted valued for the anonymized in box.

15. The system of claim 9, wherein the communication alias comprises at least one of a masked email address, a masked physical address, or a masked phone number.

16. A system for managing digital personas for online services, the system comprising:
at least one physical processor;
physical memory comprising computer-executable instructions that, when executed by the physical processor, cause the physical processor to:
generate a digital persona and a persona wear indicator (PWI) score for a user of an anonymized inbox with a communication alias to use for an online entity;
determine, based on one or more communication messages associated with the communication alias, that the online entity has leaked information associated with the digital persona, wherein, to determine that the online entity has leaked information associated with the digital persona, the computer-executable instructions further cause the physical processor to:
monitor the anonymized inbox to identify communications that are sent to the communication alias;
tag the communications that are sent to the communication alias as solicited or unsolicited; and
identify the communications sent to the communication alias from different entities while monitoring the anonymized inbox;
recalculate the PWI score for the digital persona based at least in part on the determination that the online entity has leaked the information;
determine that the PWI score exceeds a privacy score threshold; and
in response to determining that the PWI score exceeds the privacy score threshold, perform a security action that protects privacy of the user.

17. A non-transitory computer-readable medium comprising one or more computer-executable instructions that, when executed by at least one processor of a computing device, cause the computing device to:
generate a digital persona and a persona wear indicator (PWI) score for a user of an anonymized inbox with a communication alias to use for an online entity;
determine, based on one or more communication messages associated with the communication alias, that the online entity has leaked information associated with the digital persona;
recalculate the PWI score for the digital persona based at least in part on the determination that the online entity has leaked the information;
recalculate the PWI score for the digital persona based on a weighted value;
determine that the PWI score exceeds a privacy score threshold; and
in response to determining that the PWI score exceeds the privacy score threshold, perform a security action that protects privacy of the user.

18. The computer-readable medium of claim 17, wherein the security action comprises:
notifying the user that the digital persona has been compromised; and
deleting the digital persona in response to receiving an indication from the user.

19. The computer-readable medium of claim 17, wherein the security action comprises:
notifying the user that the digital persona has been compromised; and
replacing data of the digital persona with newly generated data.

20. The computer-readable medium of claim 17, wherein the digital persona comprises at least one of the communication alias, a masked credit card number, or a masked identifier.

* * * * *

UNITED STATES PATENT AND TRADEMARK OFFICE
CERTIFICATE OF CORRECTION

| | |
|---|---|
| PATENT NO. | : 11,641,369 B1 |
| APPLICATION NO. | : 16/831596 |
| DATED | : May 2, 2023 |
| INVENTOR(S) | : Kapil Anturkar and SriHarsha Angara |

It is certified that error appears in the above-identified patent and that said Letters Patent is hereby corrected as shown below:

On the Title Page

In item (72), in Column 1, in "Inventors", Line 2, delete "Fremontt (UA)" and insert
-- Fremont, CA (US) --.

Signed and Sealed this
Nineteenth Day of September, 2023

*Katherine Kelly Vidal*
Katherine Kelly Vidal
*Director of the United States Patent and Trademark Office*